United States Patent [19]

Hosmer

[11] 4,271,221

[45] Jun. 2, 1981

[54] COATING COMPOSITION FOR DECORATIVE LAMINATES

[75] Inventor: William A. Hosmer, Cape Elizabeth, Me.

[73] Assignee: Scott Paper Company, Philadelphia, Pa.

[21] Appl. No.: 62,728

[22] Filed: Aug. 1, 1979

[51] Int. Cl.³ .................... C08L 61/10; C08L 61/28; B32B 23/12; B32B 27/42

[52] U.S. Cl. .................... 428/172; 260/29.4 UA; 427/372.2; 428/530

[58] Field of Search ............... 260/29.4 UA; 428/156, 428/172, 525, 530, 531; 427/372 R

[56] References Cited

U.S. PATENT DOCUMENTS

| 2,582,303 | 1/1952 | Wohnsiedler et al. | 260/29.4 UA |
|---|---|---|---|
| 2,656,327 | 10/1953 | Wirt et al. | 260/29.4 UA |
| 2,663,696 | 12/1953 | Armatys | 260/29.4 UA |
| 2,703,765 | 3/1955 | Osdal | 428/525 |
| 2,739,081 | 3/1956 | Wohnsiedler et al. | 260/29.4 UA |
| 2,900,354 | 8/1959 | Auer et al. | 260/29.4 UA |
| 2,956,907 | 10/1960 | Schmitz et al. | 260/29.4 UA |
| 3,311,581 | 3/1967 | Pink | 260/29.4 UA |
| 3,732,137 | 5/1973 | Scher et al. | 428/151 |
| 4,158,713 | 6/1979 | Degens | 428/530 |
| 4,220,575 | 9/1980 | Wallace | 260/29.4 UA |

*Primary Examiner*—William J. Van Balen
*Attorney, Agent, or Firm*—R. Duke Vickrey; John W. Kane, Jr.

[57] ABSTRACT

Aqueous coating compositions for use in the preparation of decorative sheets employed in heat and pressure consolidated decorative laminates, comprising a pigment, a pigment binder, and a dispersion of a urea-formaldehyde resin condensate or a melamine-formaldehyde resin condensate; such coating compositions comprising, as an additional component in the preferred embodiment, a thermoplastic resin which is non-film-forming at drying temperatures.

14 Claims, No Drawings

COATING COMPOSITION FOR DECORATIVE LAMINATES

TECHNICAL FIELD

The present invention relates to coating compositions which are useful in the preparation of heat and pressure consolidated decorative laminates, and more particularly, in the preparation of the decorative sheets employed in such laminates, to the decorative sheets per se, and to laminates incorporating such sheets.

BACKGROUND ART

Heat and pressure consolidated decorative laminates have been produced commercially in the United States and elsewhere for a number of years, and have found widespread acceptance as marresistant surfaces for wall-coverings, paneling, table tops, counter tops, and the like. These laminates contain a number of laminae that are consolidated to form a unitary structure carrying a surface decoration which can range from something as simple as a solid color to something as complex as an embossed simulated wood-grain finish.

Although the methods of preparing such laminates and the number and types of laminae can vary widely, the procedure for preparing such laminates generally involves the consolidation of one or more sheets of core stock, depending primarily on the ultimate thickness desired, in combination with a decorative or print sheet and a top coat or overlay. The core stock usually comprises an unbleached kraft paper which has been impregnated with a relatively inexpensive thermosetting resin, such as a phenolic resin, which is easily crosslinked upon the application of pressure and heat.

The decorative or print sheet has more stringent requirements, in that it is usually pigment filled, and that it must still be capable of also being impregnated with a "noble" thermosetting resin which also is cross-linkable upon the application of heat and pressure, but which exhibits no color deterioration upon the application of such heat and pressure, and which prevents any strike-through or bleeding of the resin used in the corestock. In many instances, the decorative or print sheet must also be capable of being printed with a design such as a geometric pattern, simulated wood grain, etc., which survives the consolidation step intact. Two of the most common "noble" thermosetting resins which are used to impregnate the decorative or print sheet employed in the preparation of these laminates are urea-formaldehyde resin condensates and melamine-formaldehyde resin condensates, although other resins such as polyester resins have also been so employed.

In most instances, and particularly when the decorative sheet carries a printed design, an overlay sheet is superimposed over the decorative or print sheet prior to consolidation of the laminae. The overlay sheet is generally a thin, high-quality, alpha-cellulose paper which is also impregnated with a "noble" thermosetting resin, usually of the same type used to impregnate the decorative or print sheet which is employed. The overlay sheet is usually transparentized during the consolidation step, thereby enabling the decoration and/or printing which is present on the decorative or print sheet to be readily seen in the finished laminate, yet imparting a greater degree of mar and abrasion resistance to the decorative laminate than would otherwise be obtained without such an overlay.

DISCLOSURE OF THE INVENTION

The present invention relates to an aqueous coating composition which comprises a pigment, a pigment binder, and an uncoalesced dispersion of a urea-formaldehyde resin condensate or a melamine-formaldehyde resin condensate, and which has been found to be particularly useful in the preparation of components used in heat and pressure consolidated decorative laminates. These compositions are not only useful in the preparation of decorative or print sheets which are very receptive to both printing and subsequent impregnation, but that the compositions are also capable of being used to coat impregnated core stock which is then able to be subsequently printed and further impregnated, thereby eliminating the need for a special decorative or print sheet entirely. If the aqueous coating composition of this invention also includes a thermoplastic resin which is non-film-forming at the temperatures employed to dry said coating compositions and is used to coat a saturated or impregnated core stock, the resulting coated core stock can not only be subsequently calendered or otherwise surface finished and printed, but it can also be embossed and set or cross-linked so that the embossed pattern survives the subsequent impregnation and consolidation steps to form in the finished laminate an embossed or textured surface.

BEST MODE FOR CARRYING OUT THE INVENTION

As hereinbefore indicated, the aqueous coating compositions of this invention comprise, as essential components, a pigment, a pigment binder, and an uncoalesced dispersion of a urea-formaldehyde resin condensate or a melamine-formaldehyde resin condensate. Illustrative of the pigments which are useful in these coating compositions are clay, calcium carbonate, talc, titanium dioxide, metallic oxides and lightfast coloring pigments. The pigment or pigments chosen will depend upon the properties that are desired in the coating. For instance clay, calcium carbonate and talc may be used as fillers and extenders and as printing aids. Titanium dioxide will impart a high wet opacity. The metallic oxides and other lightfast pigments will provide coloration that will not degrade under the extreme conditions of the pressing cycle that is to follow.

Illustrative of the pigment binders which are useful in the coating compositions of this invention are polyvinyl alcohol, polyacrylates, polyvinyl pyrolidone and starch. A preferred binder is a polyvinyl alcohol, which because of its high pigment binding capacity, can be used in relatively small amounts. It also has the advantages of being water wettable and substantially colorless and undergoing only slight changes on aging.

As indicated above, the third essential component in the aqueous coating compositions of the present invention is a dispersion of a urea-formaldehyde resin condensate or a melamine-formaldehyde resin condensate. The particular type of resin condensate which is employed is not narrowly critical and can be any one of the numerous urea-formaldehyde or melamine-formaldehyde resin condensates which are presently commercially available under tradenames such as urea formaldehyde B-65 and Parez 613 (a melamine formaldehyde), both supplied by American Cyanamid, Resimene R1-2306, (a melamine formaldehyde) supplied by Monsanto Chemical Co. It is critical, however, that when the coating is being prepared that the resin or resins be employed in the form of a dispersion, rather than a solution. It is additionally critical that during drying of the coating, the resin particles do not coalesce but rather remain in a particulate state. This tends to produce a discontinuous coating surface and structure that is receptive to subsequent printing and impregnation after printing. At this stage the coating should be capable of being saturated. Without wishing to be bound by any one particular theory as to why dispersions of these resin condensates provide coatings having requisite printability and impregnability characteristics, it is believed that the resins being present in particulate form result in a coating with sufficient porosity to subsequently receive printing inks and/or impregnating resins, whereas solutions of these same resins would result in coatings which are relatively non-porous and substantially less receptive to printing inks and/or impregnants.

In order to insure that the resin condensates are in a dispersed rather than a dissolved form, they are diluted or mixed with water only to the extent where the resin precipitates out in the form of a dispersed phase. The formaldehyde condensation products are available commercially in the form of powders that can be dissolved in water or in the form of syrups. When either of these forms are combined with water, experience has shown that the dispersed phase is obtained when the amount of resinous material is below 25% and more likely in a range of 15 to 25%. The dispersed phase is easily discernible by its milky appearance.

As also indicated above, the coating compositions of this invention can also comprise a thermoplastic resin which is nonfilm-forming at temperatures employed to dry said coating composition. The use of such a resin generally improves the surface smoothness of the dried coating and also its printability. The thermoplastic resin should have certain characteristics. Needless to say, it should be compatible with melamine or polyester saturating resins used to impregnate the decorative sheet after printing. Among the other more important characteristics is a sufficiently high glass transition temperature (e.g., about 68° C.) so that the resin does not flow or form a film during the coating and drying operations. Formation of a film would significantly reduce or negate the porosity needed for later impregnation. During the laminating process, the resin should not form a barrier preventing the saturating resins from penetrating the coating.

Also the resin should be relatively stable to color degradation under the rigorous consolidation steps and later on, during use as a laminate. Illustrative of such thermoplastic resins having the above described characteristics are resins such as the following Rohm & Haas resins:

Rhoplex B-85, an acrylic polymer,
Rhoplex B-83, a styrene/acrylic copolymer, and
Rhoplex B-924, a metal cross-linked acrylic polymer.

The amounts of various components employed in the coating compositions of the present invention are not narrowly critical and can range, for example, from about 55 parts by weight to about 80 parts of weight of pigment per 100 parts by weight of dry coating, from about 1 part by weight to about 5 parts by weight of pigment binder per 100 parts by weight of dry coating, and from about 5 parts by weight to about 40 parts by weight of resin condensate per 100 parts by weight of dry coating. When the coating composition also includes a thermoplastic resin which is non-film-forming at temperatures employed to dry the coating composition, the amounts of the various components range, for example, from 45 parts by weight to about 80 parts by weight of pigment per 100 parts by weight of dry coating, from about 1 part by weight to about 5 parts by weight of pigment binder per 100 parts by weight of dry coating, from about 5 parts by weight to about 30 parts by weight of resin condensate per 100 parts by weight of dry coating, and from about 5 parts by weight to about 20 parts by weight of thermoplastic resin per 100 parts by weight of dry coating.

The coating may be applied by any of several well known means used by the paper coating industry. Typical of these would be the air knife coater, the blade coater and the roll coater. There are two requirements which the coating usually must satisfy. It should have sufficient opacity to prevent show through of the core stock and it must be a good match for the color desired. To satisfy the opacity requirement, it may be necessary to apply several layers of coating so that a particular weight of coating can be set down. Also influential in meeting these requirements will be the color and opacity of the coating materials as well as the surface and color of the paper that is being coated. Generally the coating weight will be in a range of from 10 to 60 pounds per ream of 3,300 ft$^2$, although more or less could be applied.

After coating, the surface is generally smoother than papers made without a coating operation and the sheet may be used for solid colors or uncritical printing without further processing. However, the coated sheets may also be finished to obtain the characteristics of a fine printing surface. This may be done by any of a number of finishing methods such as supercalendering or gloss calendering, but will depend primarily on the smoothness and gloss desired in the finished sheet. In addition, this coating has the capacity of being finished by means used to prepare top quality printing papers where the printing surface is obtained by molding the coated surface while in contact with a drum or cylinder having a highly polished, mirror-like surface. This produces a coated surface that gives exceptional printing fidelity that heretofore had not been used on papers that have to be saturated as a step after printing.

Printing of the papers used for decorative laminates is commonly done by direct gravure, because of the continuity demanded by some designs, the volume printed, and because this method works well on bulky absorbent sheets. The coated surface of this invention may be done by this method, producing superior print fidelity, but it also may be satisfactorily produced by offset techniques with the attainment of fidelity equivalent to present methods. In addition, the printing of a heavier core stock, particularly when first saturated with resin, gives advantages of dimensional stability conducive to obtaining sharper prints due to being able to maintain more precise register in multiple printing designs.

By coating a core stock that has been first saturated with the core laminating resin, another advantage can be obtained. It has been found that after coating, and printing if desired, the sheet may be passed through an embosser to imprint patterns such as woodgrains, slate, leather or other finishes. Now, while subjecting this embossed sheet to a combination of temperature and time sufficient to substantially cure the core stock resin, the embossed pattern may be stabilized into this decorative layer. Such a sheet may be further saturated with the resin used in the top layer, laminated in the usual manner, with or without an overlay sheet, leaving an embossed surface plainly embedded as part of the surface decoration. Present methods of obtaining this embossed pattern are by using plates which bear the embossing patterns, but such techniques are costly, or by using embossed release papers which do not produce the embossed depth capable of being produced by the teachings of this invention.

The following examples illustrate the invention.

EXAMPLE 1

Unbleached kraft core stock having a basis weight of 112 lbs./ream of 3,300 ft$^2$ was saturated with phenolic laminating resin to a content of 30%. The saturated core stock had a total weight of 160 lbs./ream of 3,300 ft$^2$ with 8% volatiles. This saturated core stock was then coated with the following coating composition.

| Component | Parts Dry Wgt. |
| --- | --- |
| Titanium dioxide (National Lead 2080) | 45.0 |
| Iron oxide, yellow (Mapico Yellow 2100 - Cities Service) | 45.0 |
| Iron oxide, red (516K red iron oxide - Cities Service) | 3.5 |
| Acrylic polymer emulsion (Rhoplex B-83, Rohm & Haas at 44% solids) | 10.0 |
| Melamine formaldehyde resin (Parez 613 - American Cyanamid) | 15.0 |
| Polyvinyl alcohol (Vinol 125 - Air Reduction Products) | 2.5 |
| Black pigment (ImperseBlack X-2488 - Hercules) | 1.5 |
| Tetrasodium pyrophosphate | 0.75 |
| Water to make coating solids of 52% | |

The coating was applied to the saturated corestock by means of a meyer rod and then dried with infrared heat. Approximately 15 lbs. of coating/ream of 3,300 ft$^2$ were obtained with each meyer rod draw down. Samples were prepared by coating each saturated core stock base with three separate coating applications to provide a total coating weight of about 45 lbs./ream of 3,300 ft$^2$. Part of the coated samples were finished to a Sheffield smoothness of 80 by calendering between steel rolls at room temperature at a pressure of 700 lbs. per linear inch (pli). The remainder of the samples were finished by passing them through a nip formed by a heated, highly polished, chrome plated drum and a rubber backing roll. The coated surfaces of the samples were pressed against the chrome plated drum to soften and mold the coating. Samples finished by this method tended to replicate the high gloss of the drum and they had Sheffield smoothness readings of approximately 35.

The samples were printed on a gravure printing press and then consolidated with other laminates. The laminated composite consisted of four sheets of phenolic resin saturated kraft core stock superimposed with one of the coated and printed core stock samples described above and on this a melamine overlay (about 62% melamine solids). The composites were pressed using the various coated and printed core stock samples at 285° F. for 15 minutes at 1,000 psi. Laminates made were comparable in physical properties to commercial laminates and possessed print design fidelity that was much sharper than some designs printed on standard absorbent papers.

EXAMPLE 2

A coating formula consisting of the following ingredients was coated on phenolic saturated kraft similar to Example 1 using a meyer rod.

| Component | Parts Dry Wgt. |
| --- | --- |
| Titanium dioxide (National Lead 2080) | 75.0 |
| Iron oxide, yellow (Mapico Yellow 2100 - Cities Service) | 20.0 |
| Iron oxide, red (R-2899 Red Oxide - Pfizer) | 5.0 |
| Melamine formaldehyde resin (Parez 613 - American Cyanamid) | 15.0 |
| Acrylic polymer emulsion (Rhoplex B-85 - Rohm & Haas) | 10.0 |
| Polyvinyl alcohol (Vinol 125 - Air Reduction Products) | 2.5 |
| Tetrasodium pyrophosphate | 1.0 |
| Black pigment (Aquablak 55 - Columbia Carbon & Ribbon) | 0.25 |
| Defoaming agent, a polyoxyethylene polyoxypropylene polymer (Pluronic L-61 - Wyandotte Chemicals | 0.1 |
| Water to make coating solids at 51.3% | |

These coatings were applied to the sample for a total coating weight of approximately 45 lbs./ream of 3,300 ft$^2$. They were cured by infrared heat. Samples were then embossed in a two roll mating embosser with a simulated leather pattern, producing a deep pattern without breaking the coating on the sheets. The embossed samples were then cured in an oven for 1 hour at 125° C. giving a weight loss of 4.5% and essentially driving off all volatiles. The samples were then further saturated with Monsanto R1-2306 low pressure melamine resin at 50% concentration in an amount of from 20-30% of the total weight of the sheet, and cured for approximately 1 minute at 125° C. The embossed treated samples were then pressed against ¾" particleboard for 5 minutes at 290° F. and 300 psi. A sheet of commercial smooth release paper was used over the printed embossed surface and 4 sheets of unsaturated core stock were used as padding between the release sheet and the caul plate. Upon removal from the press, the resulting pressed laminate to particle board exhibited clear, faithful embossed patterns on their surfaces.

EXAMPLE 3

A coating formula consisting of the following ingredients was coated on phenolic saturated kraft core stock using a meyer rod. Three coatings were applied and dried to provide a total coating weight of approximately 40 lbs./ream of 3,300 ft$^2$.

| Component | Parts Dry Wgt. |
| --- | --- |
| Titanium dioxide (National Lead 2080) | 100.0 |
| Acrylic polymer emulsion (Rhoplex B-924 - Rohm & Haas) | 8.35 |
| Melamine formaldehyde resin (Parez 613 - American Cyanamid) | 14.8 |
| Polyvinyl alcohol (Vinol 125 - Air Reduction Products) | 2.5 |
| Tetrasodium pyrophosphate | 1.0 |

The sheet was printed with a denim design, embossed with a denim pattern on an embossing machine and cured by heating one hour at 125° C. The sheet was then saturated with a 50% solution of Monsanto high pressure melamine resin 833 and cured for one minute at 125° C. The amount of resin picked up on saturation was 22.7% based on the total weight of the sheet. This sheet was then placed on top of four phenolic saturated core stock sheets. Superimposed on the embossed treated sheet was a sheet of release paper backed with four untreated core sheets for padding and balancing. The entire sandwich was pressed between steel plates for 8 minutes at 280° F. and 900 psi. After the press cycle, the sandwich was allowed to cool to room temperature and the panel was subsequently removed from the press. On the surface of the panel, the denim pattern was clearly visible as a printed pattern and also as a textured embossed pattern.

It is apparent that other variations and modifications may be made without departing from the present invention. It is expected that there may be other methods that might work equally as well. Accordingly it should be understood that the forms of the present invention described above are illustrative only and not intended to limit the scope of the invention.

What is claimed is:

1. An aqueous coating composition comprising a pigment, a pigment binder, and an uncoalesced dispersion of a urea-formaldehyde resin condensate or a melamine-formaldehyde resin condensate.

2. The aqueous coating composition according to claim 1 wherein the dispersion of the urea-formaldehyde resin condensate or the melamine-formaldehyde resin condensate is less than 25%.

3. The aqueous coating composition according to claim 1 wherein the dispersion of the urea-formaldehyde resin condensate or the melamine-formaldehyde resin condensate is in the range of 15% to 25%.

4. The aqueous coating composition according to any of claims 1, 2, or 3 which comprises, as an additional component, a thermoplastic resin which is non-film-forming at the temperatures employed to dry said coating composition.

5. A decorative sheet suitable for saturation and consolidation with one or more other laminae to form a heat and pressure consolidated decorative laminate, the decorative sheet comprising a porous sheet material coated on at least one side with the coating composition of claim 1, the coating composition being dried and the resin condensate being in an uncoalesced, particulate state.

6. The decorative sheet according to claim 5, wherein the coating composition based on 100 parts by weight of dry coating, contains from about 55 to about 80 parts by weight of pigment, from about 1 to about 5 parts by weight of pigment binder and from about 5 to about 40 parts by weight of resin condensate.

7. The decorative sheet according to claim 5, further including as an additional component in the coating composition a thermoplastic resin which has been dried without forming a film.

8. The decorative sheet according to claim 7, wherein the coating composition, based on 100 parts by weight of dry coating, contains from about 45 to about 80 parts by weight of pigment, from about 1 to about 5 parts by weight of pigment binder, from about 5 to about 30 parts by weight of resin condensate and from about 5 to about 20 parts by weight of thermoplastic resin.

9. The decorative sheet according to either claim 5 or claim 7, wherein the coating is finished by pressing against a highly-polished surface.

10. The decorative sheet according to claim 7, wherein the decorative sheet is embossed.

11. The decorative sheet according to claim 5, wherein the porous sheet material is provided by a laminate corestock of phenolic saturated Kraft paper.

12. A heat and pressure consolidated decorative laminate having in its construction the decorative sheet according to claim 5.

13. A method of manufacturing the decorative sheet of claim 5, comprising the steps of coating a porous sheet material with the coating composition of claim 1 and drying the coating without coalescing the resin condensate.

14. The method according to claim 13, wherein the coating composition is provided by an aqueous coating composition comprising a pigment, a pigment binder, an uncoalesced dispersion of a urea-formaldehyde resin condensate or a melamine-formaldehyde resin condensate in the range of 15% to 25%, and as an additional component, a thermoplastic resin which is non-film-forming at the temperatures employed to dry said coating composition, and the coating is dried without forming a film with the thermoplastic resin.

* * * * *